United States Patent
Xu et al.

(10) Patent No.: US 12,341,427 B2
(45) Date of Patent: Jun. 24, 2025

(54) SKIP CLAMP CIRCUIT FOR DC-DC POWER CONVERTERS

(71) Applicant: Texas Instruments Incorporated, Dallas, TX (US)

(72) Inventors: Hongcheng Xu, Freising (DE); Konrad Wagensohner, Mauern (DE); Michael Schlenker, Marzling (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 321 days.

(21) Appl. No.: 18/170,085

(22) Filed: Feb. 16, 2023

(65) Prior Publication Data
US 2023/0299675 A1   Sep. 21, 2023

Related U.S. Application Data

(60) Provisional application No. 63/320,164, filed on Mar. 15, 2022.

(51) Int. Cl.
*H02M 3/158* (2006.01)
*H02M 1/08* (2006.01)

(52) U.S. Cl.
CPC ............. *H02M 3/158* (2013.01); *H02M 1/08* (2013.01)

(58) Field of Classification Search
CPC ...... H02M 3/158; H02M 1/08; H02M 1/0025; H02M 3/1566
See application file for complete search history.

(56) References Cited

U.S. PATENT DOCUMENTS

| | | |
|---|---|---|
| 5,717,322 A | 2/1998 | Hawkes et al. |
| 7,482,796 B2 | 1/2009 | Nishida |
| 7,518,348 B1 | 4/2009 | Kobayashi |
| 7,710,700 B2 | 5/2010 | Young |
| 10,090,663 B2 | 10/2018 | Chen et al. |
| 10,965,216 B2 | 3/2021 | Thiele et al. |
| 11,509,223 B2 | 11/2022 | Arno |
| 11,539,294 B2 | 12/2022 | Mangudi et al. |
| 11,616,436 B2 * | 3/2023 | Mei ...................... H02M 1/0025 323/282 |

(Continued)

OTHER PUBLICATIONS

International Search Report; PCT/US2023/014439; mail date:May 6, 2023; 2 pages.

*Primary Examiner* — Kyle J Moody
(74) *Attorney, Agent, or Firm* — Valerie M. Davis; Frank D. Cimino

(57) ABSTRACT

Described embodiments include a circuit with a first amplifier having first and second amplifier inputs and a first amplifier output. The first amplifier input is coupled to a reference voltage terminal. The second amplifier input is coupled to a voltage feedback terminal. A second amplifier has third and fourth amplifier inputs and second and third amplifier outputs. The third amplifier input is coupled to the first amplifier output. A first switch has first and second switch terminals. The second switch terminal is coupled to the fourth amplifier input. A third amplifier has fifth and sixth amplifier inputs and a fourth amplifier output. The fifth amplifier input is coupled to the second amplifier output. The sixth amplifier input is coupled to the third amplifier output. A second switch has a third switch terminal coupled to the fourth amplifier output, and a fourth switch terminal coupled to the first amplifier output.

20 Claims, 4 Drawing Sheets

(56) References Cited

U.S. PATENT DOCUMENTS

| | | |
|---|---|---|
| 2006/0279268 A1 | 12/2006 | Yu |
| 2008/0067989 A1 | 3/2008 | Kasai et al. |
| 2009/0237055 A1 | 9/2009 | Sakai et al. |
| 2015/0123638 A1* | 5/2015 | Thiele .................. H02M 3/156 |
| | | 323/293 |
| 2017/0229966 A1 | 8/2017 | Thiele et al. |

* cited by examiner

SKIP CLAMP CIRCUIT FOR DC-DC POWER CONVERTERS

CROSS-REFERENCE TO RELATED APPLICATION

This application claims priority to U.S. Provisional Patent Application No. 63/320,164 filed Mar. 15, 2022, which is incorporated herein by reference.

BACKGROUND

This description relates to DC-DC voltage converters, and in particular to skip clamp circuits in DC-DC voltage converters. Skip clamp circuits can improve performance of a voltage converter while it is in a power save mode. When a switching DC-DC voltage converter is powered by a DC power source, it provides power at a regulated voltage to a load that is connected to its output. An inductor may be coupled to a switching terminal of the DC-DC voltage converter to store energy during operation of the converter. In a buck or a boost DC-DC voltage converter, the output voltage provided to the load is regulated to be less than or greater than, respectively, the voltage of the input DC power source.

Some DC-to-DC voltage converters include a feedback loop having an error amplifier to provide a feedback voltage proportional to a current through an inductor that is coupled to the output. A current feedback loop can be designed to prevent the voltage at the output of the error amplifier from exceeding a current limit clamp voltage if the DC-DC voltage converter enters an over-current condition. A voltage feedback loop can be designed to prevent the voltage at the output of the error amplifier from going either above or below a skip clamp voltage when the DC-DC voltage converter is in a skip mode.

SUMMARY

In a first example, a circuit includes a first amplifier having first and second amplifier inputs and a first amplifier output. The first amplifier input is coupled to a reference voltage terminal, and the second amplifier input is coupled to a voltage feedback terminal. A second amplifier has third and fourth amplifier inputs and second and third amplifier outputs, wherein the third amplifier input is coupled to the first amplifier output. A first switch has first and second switch terminals, and the second switch terminal is coupled to the fourth amplifier input. A resistor is coupled between the first amplifier output and the first switch terminal.

A third amplifier has fifth and sixth amplifier inputs and a fourth amplifier output. The fifth amplifier input is coupled to the second amplifier output, and the sixth amplifier input is coupled to the third amplifier output. A second switch has third and fourth switch terminals. The third switch terminal is coupled to the fourth amplifier output, and the fourth switch terminal is coupled to the first amplifier output.

In a second example, a voltage regulator circuit includes an integrator having first and second integrator inputs and an integrator output. The first integrator input is coupled to a reference voltage terminal, and the second integrator input is coupled to a feedback voltage terminal. A comparator has first and second comparator inputs and first and second comparator outputs. The first comparator input is coupled to the integrator output, and the second comparator input is coupled to an inner feedback terminal.

A transconductance amplifier has first and second transconductance inputs and a transconductance output. The first transconductance input is coupled to the first comparator output, the second transconductance input is coupled to the second comparator output, and the transconductance output is coupled to the first comparator input. A gate driver circuit has first and second gate drive outputs and a gate drive input. The gate drive input is coupled to the comparator output.

A high-side transistor has a high-side control terminal. The high-side transistor is coupled between an input voltage terminal and a switch terminal, and the high-side control terminal is coupled to the first gate drive output. A low-side transistor has a low-side control terminal. The low-side transistor is coupled between the switch terminal and a ground terminal, and the low-side control terminal is coupled to the second gate drive output.

DETAILED DESCRIPTION

In this description, the same reference numbers depict same or similar (by function and/or structure) features. The drawings are not necessarily drawn to scale.

In some DC-to-DC voltage converters, regulation of the output voltage may be performed by a circuit having a feedback loop. The feedback loop may include an error amplifier that compares a feedback voltage that is proportional to the output voltage to a reference voltage. When the voltage regulator is operating in a power save mode, the output of the error amplifier may benefit from having the output voltage of the error amplifier clamped within a particular voltage range. The circuitry that maintains the amplifier output voltage within this particular voltage range is a skip clamp circuit.

Figure 1:
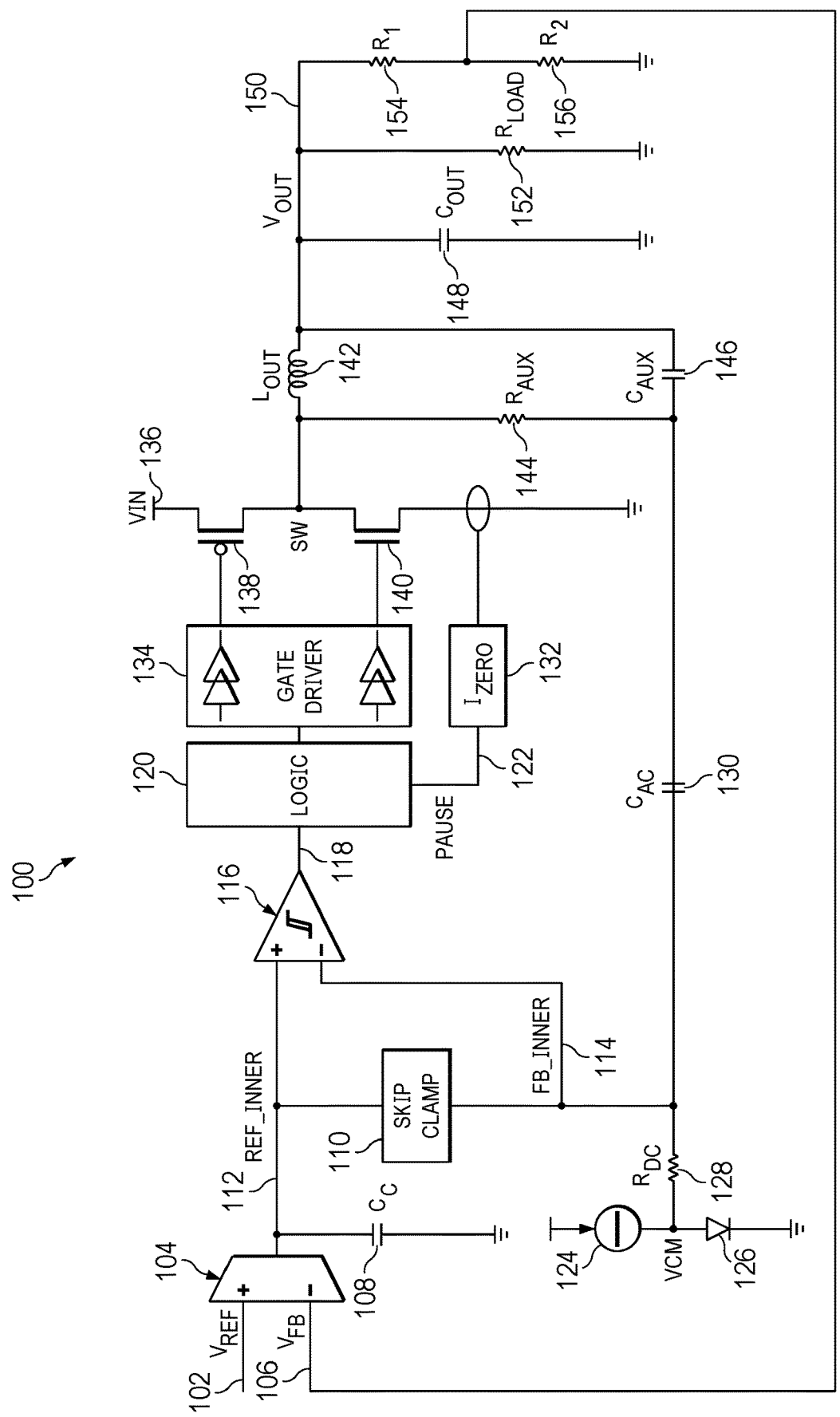
FIG. 1 shows a schematic diagram for an example voltage regulator having a skip clamp circuit.

FIG. 1 shows a schematic diagram for an example voltage regulator 100 having a skip clamp circuit. The input voltage terminal for voltage regulator 100 is $V_{IN}$ 136, and the output voltage terminal is $V_{OUT}$ 150. An integrating error amplifier 104 has a first input coupled to $V_{REF}$ 102, and has a second input coupled to $V_{FB}$ 106. The output 112 of error amplifier 104, REF_INNER, is coupled to a first input of comparator 116. Capacitor $C_C$ 108 is coupled between REF_INNER and a ground terminal. In at least one case, comparator 116 is a hysteretic comparator. However, in other cases, comparator 116 may be a comparator without hysteresis.

The second input of comparator 116 is coupled to an inner feedback terminal, FB_INNER 114. Skip clamp circuit 110 is coupled between the first and second inputs of comparator 116. The output 118 of comparator 116 is coupled to a first input of logic circuit 120. Logic circuit 120 may include AND gates, OR gates, latches and flip-flops. A second input to logic circuit 120 is coupled to the output of IZERO circuit 132. IZERO circuit 132 detects when the current through an inductor 142 crosses a threshold value, such as zero amps.

The output of logic circuit 120 is coupled to the input of gate driver circuit 134. A first output of gate driver circuit 134 is coupled to the gate of transistor 138. A second output of gate driver circuit 134 is coupled to the gate of transistor 140. Transistor 138 is coupled between $V_{IN}$ 136 and switch terminal SW. Transistor 140 is coupled between switch terminal SW and a ground terminal. Inductor 142 is coupled between the switch terminal SW and the output voltage terminal $V_{OUT}$ 150. A first terminal of resistor 144 is coupled to the switch terminal SW and to inductor 142. Capacitor 148 and resistor 152 are coupled in parallel between the output voltage terminal $V_{OUT}$ 150 and the ground terminal.

Resistors 154 and 152 are coupled in series between the output voltage terminal $V_{OUT}$ 150 and the ground terminal, creating a voltage divider for the voltage at the output voltage terminal $V_{OUT}$ 150. The output of the voltage divider is coupled to the feedback voltage terminal $V_{FB}$ 106. Capacitor 146 is coupled between inductor 142 and a second terminal of resistor 144. Capacitor 130 is coupled between capacitor 146 and the inner feedback terminal FB_INNER 114.

Integrating amplifier 104 compares the voltage at the feedback voltage terminal $V_{FB}$ 106 to a reference voltage $V_{REF}$ 102, and provides an error signal REF_INNER 112 at its output for output voltage regulation. IZERO circuit 132 has an input current signal that is proportional to a current flowing through transistor 140. This input current signal is compared to an internal reference current signal. In at least one example, the internal reference current signal is zero, making the IZERO circuit 132 a zero-current detection circuit that can detect when the current through inductor 142 crosses zero and reverses polarity.

If the output current load decreases, the voltage at the output voltage terminal $V_{OUT}$ 150 may increase, making the voltage at $V_{FB}$ 106 higher than the voltage at $V_{REF}$ 102. If the voltage at REF_INNER 112 is not clamped, it will go to the negative rail voltage (e.g. ground) because it is coupled to the output of an integrator. If a load transient occurs, the voltage at the output voltage terminal $V_{OUT}$ 150 will droop. The output voltage of error amplifier 104, which usually has a limited bandwidth, may respond relatively slowly to a change at its inputs. With the relatively low bandwidth of error amplifier 104, it takes longer for the voltage at the output voltage terminal $V_{OUT}$ 150 to return to its regulated voltage value.

Clamping circuit 110 is coupled between the first and second inputs of comparator 116, and is helpful to clamp the voltage at REF_INNER 112 to a value that holds the voltage differential between REF_INNER 112 and FB_INNER 114 within a particular range. The clamping circuit helps the comparator to accurately control how long voltage regulator 100 remains in a power save mode. The purpose of skip clamp circuit 110 is to limit the voltage swing of REF_INNER 112 during skip time. Limiting the voltage swing of REF_INNER 112 can reduce the undershoot of the output voltage if a load current surge occurs. However, there is a tradeoff in voltage regulator 100 between regulation voltage precision and load transient response time while in power save mode.

In ideal conditions when in power save mode, the voltage differential between the comparator inputs REF_INNER 112 and FB_INNER 114 will always be proportional to the voltage differential between the integrating amplifier inputs, $V_{REF}$ 102 and $V_{FB}$ 106. The voltage at FB_INNER 114 is set by diode 126, which is coupled to ground through resistor 128. If skip clamp circuit 110 is not present, the voltage at REF_INNER 112 will saturate at ground. If a load transient occurs, the output 118 of comparator 116 will not change its output state until the voltage at the output voltage terminal $V_{OUT}$ 150 decreases enough to overcome the voltage difference between FB_INNER and REF_INNER. The voltage at the output voltage terminal $V_{OUT}$ 150 has to drop to near ground to change the output state of comparator 118. This can be detrimental to the voltage regulator's load transient response.

Figure 2:
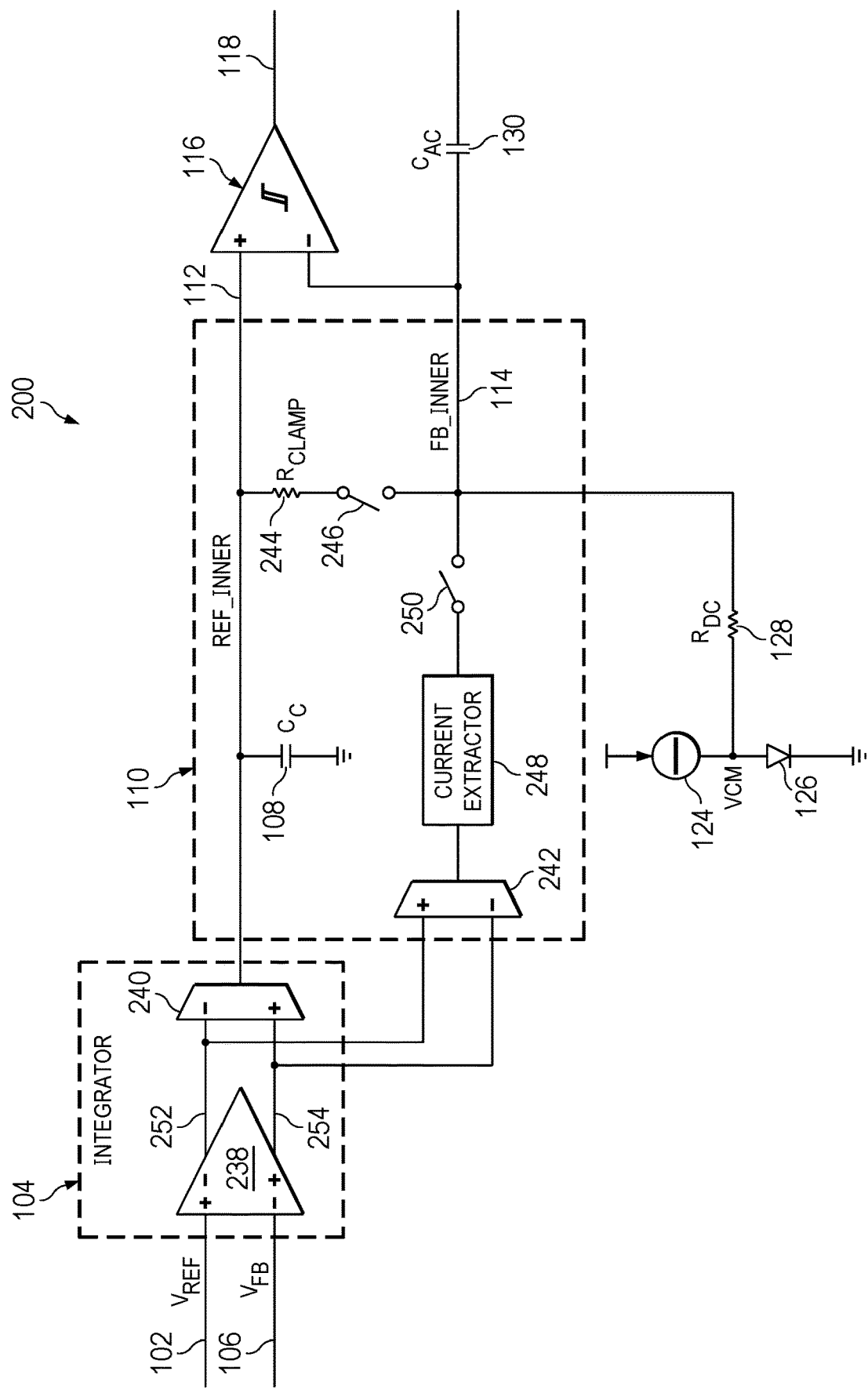
FIG. 2 shows a schematic diagram for an example voltage regulator control loop with a skip clamp circuit.

FIG. 2 shows a schematic diagram 200 for an example voltage regulator control loop with a skip clamp circuit. Integrating error amplifier 104 has a first input coupled to reference voltage terminal $V_{REF}$ 102, and a second input coupled to feedback voltage terminal $V_{FB}$ 106, which is proportional to a voltage regulator output voltage. Differential outputs 252 and 254 of error amplifier 104 are coupled as differential inputs to amplifier 240. Capacitor 108 is coupled between the output of amplifier 240 and ground. Resistor 244 is coupled between the output of amplifier 240 and a first terminal of switch 246.

The differential outputs 252 and 254 of error amplifier 104 are also coupled to the differential inputs of amplifier 242. The output of amplifier 242 is coupled to the input of current extractor 248. The output of current extractor 248 is coupled to a first terminal of switch 250. The output of amplifier 240 is coupled to a first input of comparator 116. A second terminal of switch 250 is coupled to a second input of comparator 116 and to a second terminal of switch 246. A current source 124 is coupled in series with diode 126 between a voltage supply and the ground terminal. Diode 126 is coupled to FB_INNER 114 through resistor 128 and sets the voltage at FB_INNER 114.

Skip clamp 110 holds the voltage difference between REF_INNER 112 and FB_INNER 114 within a particular range. Adjustments to the voltage at REF_INNER 112 can be made by closing switch 246 to connect resistor 244 between REF_INNER 112 and FB_INNER 114. If the voltage at $V_{FB}$ 106 is higher than the voltage at $V_{REF}$ 102, the output of error amplifier 104 could saturate at the negative rail if no skip clamp circuit was present. A current flowing through resistor 244 is coupled to REF_INNER, creating a voltage across resistor 244. The current through resistor 244 is proportional to $V_{FB}-V_{REF}$. The worst-case voltage across resistor 244 can be calculated using equation (1):

$$V_{244}=(V_{FB}-V_{REF})*g_{m1}*R_{CLAMP} \quad (1)$$

where $g_{m1}$ is the combined transconductance of amplifiers 238 and 240, and $R_{CLAMP}$ is the resistance of resistor 244. The skip clamp voltage is dynamic because it depends on the feedback voltage at $V_{FB}$ 106.

Comparator 116 may have an offset voltage that increases the regulation boundary voltage necessary for comparator 116 to change states. Comparator 116 will change states when the voltage difference ($V_{REF}-V_{FB}$) overcomes the offset voltage, which is divided by the combined transconductance of amplifiers 238 and 240 (Vos'=Vos/($g_{m1}*R_{CLAMP}$)).

The skip clamp circuit 110 of voltage regulator 200 has at least one limitation, however. If the combined ripple and feedback voltage is higher than the reference voltage, that puts a certain clamping voltage across resistor 244 that is larger than the offset voltage, preventing comparator 116 from changing states. If a load transient occurs at that time, the voltage undershoot which is coupled through capacitor 130 must first overcome this clamped voltage before the output 118 of comparator 116 will begin increasing inductor current to respond to the voltage undershoot.

Having a smaller $g_{m1}*R_{CLAMP}$ combination provides a better load transient response because it produces a lower clamping voltage. Conversely, having a larger $g_{m1}$ provides a more accurate steady-state voltage regulation. So, a performance tradeoff exists because a higher transconductance improves voltage regulation accuracy at the expense of transient response, while a lower $g_m$ provides a faster transient response at the expense of degraded voltage regulation accuracy.

Figure 3:
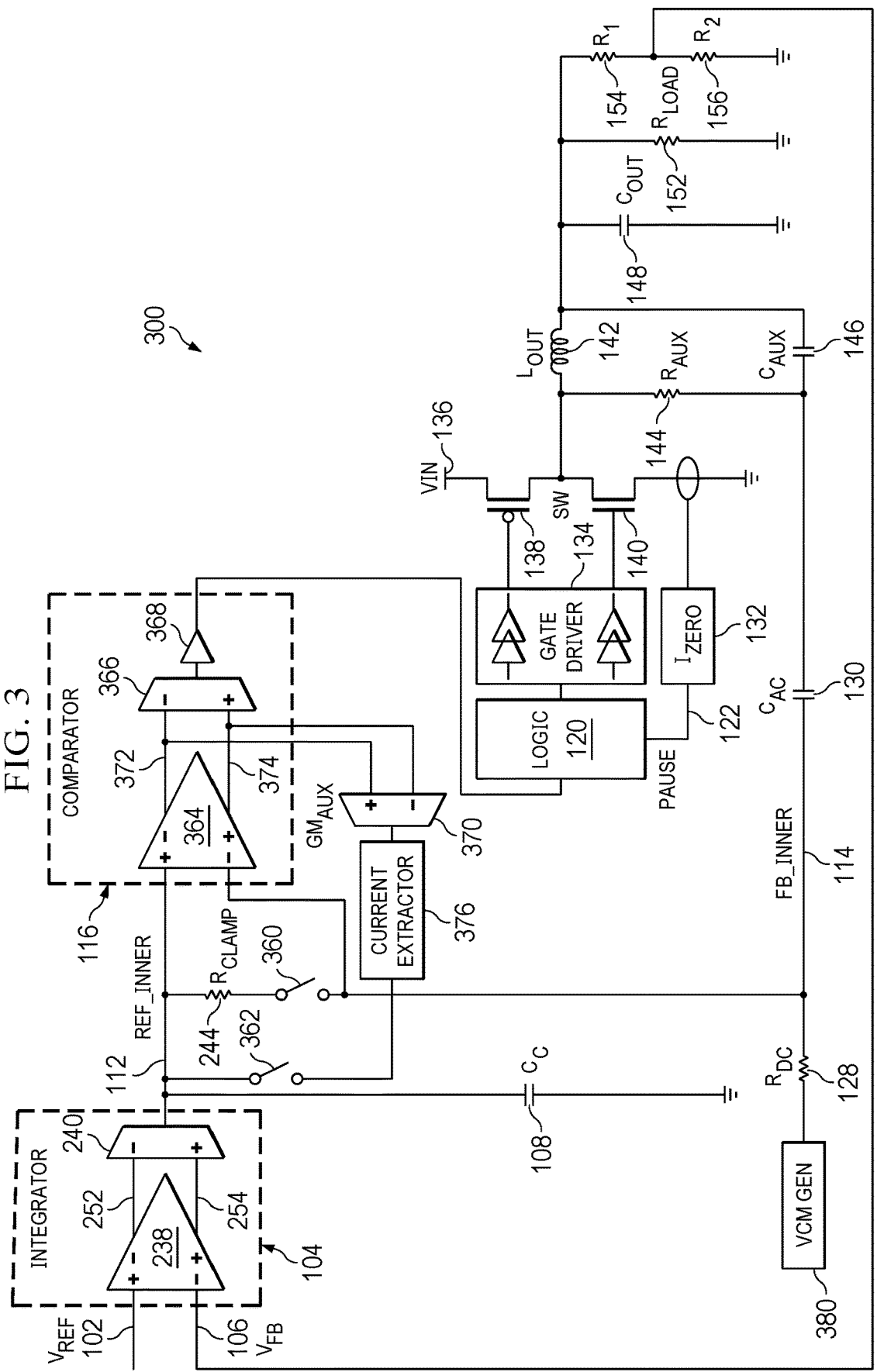
FIG. 3 shows a schematic diagram for an example voltage regulator having an active skip clamp combined with a passive clamp.

FIG. 3 shows a schematic diagram for an example voltage regulator 300 having an active skip clamp combined with a passive clamp. The input voltage terminal for voltage regulator 300 is $V_{IN}$ 136, and the output voltage terminal is $V_{OUT}$ 150. An integrating error amplifier 104 has a first input coupled to $V_{REF}$ 102, and has a second input coupled to $V_{FB}$ 106. Integrating error amplifier 104 is comprised of two amplifier stages: preamplifier 238 and amplifier 240. Differential outputs 252 and 254 of preamplifier 238 are coupled to respective differential inputs of amplifier 240.

Comparator 116 is comprised of three stages: preamplifier 364, comparator stage 366 and driver 368. The output 112 of amplifier 240, REF_INNER, is coupled to a first input of preamplifier 364. Capacitor $C_C$ 108 is coupled between REF_INNER and a ground terminal. The second input of preamplifier 364 is coupled to an inner feedback terminal, FB_INNER 114. Differential outputs 372 and 374 of preamplifier 364 are coupled to respective differential inputs of comparator stage 366. The output of comparator stage 366 is coupled to the input of driver 368. The output of driver 368 is coupled to a first input of logic circuit 120. Logic circuit 120 may include AND gates, OR gates, latches and flip-flops. A second input to logic circuit 120 is coupled to the output of IZERO circuit 132. IZERO circuit 132 detects when the current through an inductor 142 crosses a particular threshold value, such as zero amps.

The output of logic circuit 120 is coupled to the input of gate driver circuit 134. A first output of gate driver circuit 134 is coupled to the gate of transistor 138. A second output of gate driver circuit 134 is coupled to the gate of transistor 140. Transistor 138 is coupled between $V_{IN}$ 136 and a switching terminal SW. Transistor 140 is coupled between switching terminal SW and a ground terminal. Inductor 142 is coupled between the switching terminal SW and the output voltage terminal $V_{OUT}$ 150. A first terminal of resistor 144 is coupled to the switching terminal SW and to inductor 142. Capacitor 148 and resistor 152 are coupled in parallel between the output voltage terminal $V_{OUT}$ 150 and the ground terminal.

Resistors 154 and 152 are coupled in series between the output voltage terminal $V_{OUT}$ 150 and the ground terminal, making a voltage divider for the voltage at the output voltage terminal $V_{OUT}$ 150. The output of the voltage divider is coupled to the feedback voltage terminal $V_{FB}$ 106 and provides feedback for voltage regulation. Capacitor 146 is coupled between inductor 142 and a second terminal of resistor 144. Capacitor 130 is coupled between capacitor 146 and FB_INNER 114.

Preamplifier 238 of integrator 104 compares the voltage at the feedback voltage terminal $V_{FB}$ 106 to a reference voltage $V_{REF}$ 102, and provides a differential output error signal representing the difference between the voltages at $V_{FB}$ 106 and $V_{REF}$ 102. The differential output error signal at 252 and 254 is provided as a differential input to amplifier 240. The single-ended output of amplifier 240 is REF_INNER 112. IZERO circuit 132 has an input current signal that is proportional to a current flowing through transistor 140. This input current signal is compared to an internal reference current signal. The internal reference current signal may be set to zero, making IZERO circuit 132 a zero-current detection circuit that can detect when the current through inductor 142 reverses polarity.

The differential inputs of transconductance amplifier 370 are respectively coupled to the differential outputs 372 and 374 of preamplifier 364. A single-ended output of transconductance amplifier 370 is coupled to an input of current extractor 376. The output of current extractor 376 is coupled to a first terminal of switch 362. The output of current extractor 376 provides current when the output of transconductance amplifier 370 is positive, and does not provide current when the output of transconductance amplifier 370 is negative. A second terminal of switch 362 is coupled to REF_INNER 112. Resistor 244 and switch 360 are coupled between the first input and the second input of preamplifier 364. FB_INNER 114 is coupled to a common mode voltage generator 380 through resistor 128.

Voltage regulator 300 uses an active skip clamp circuit in combination with a passive skip clamp circuit. Preamplifier 364 senses the difference in voltage between REF_INNER 112 and FB_INNER 114 and provides a differential output to a differential input of transconductance amplifier 370. Transconductance amplifier 370 provides a current at its output that is proportional to the clamping voltage, which corresponds to the difference in voltage between REF_INNER 112 and FB_INNER 114. Current extractor 376 provides a current proportional to the output of transconductance amplifier 370. The current at the output of transconductance amplifier 370 is subtracted from the current at the output of integrator 104, and the difference is provided to the first input of preamplifier 364.

Transconductance amplifier 370, current extractor 376 and switch 362 form a feedback loop to cancel a portion of the current through integrator 104 in the case where the voltage difference between $V_{REF}$ 102 and $V_{FB}$ 106 becomes relatively large. This cancellation helps to prevent comparator 116 from saturating and becoming stuck in a particular output state as a result of an output load transient. The feedback loop performs a partial cancellation of the integrator transconductance, which lowers the clamping voltage. However, the regulation accuracy of the voltage regulator is not compromised.

The clamping voltage between REF_INNER 112 and FB_INNER 114 approaches zero as comparator 116 approaches the tripping point to transition from one output state to another. The transconductance $GM_{AUX}$ that is fed back to the output of integrator 104 also approaches zero. However, the offset voltage in the integrator stage is still being compensated for, which helps to maintain the voltage regulation accuracy. The equation for the clamping offset voltage in power save mode under a light load condition is shown in equation (2):

$$V_{FB\_INNER} - V_{REF\_INNER} = (V_{FB} - V_{REF})\frac{g_{m1}R_{CLAMP}}{1+g_{m2}R_{CLAMP}} - V_{OS}\frac{g_{m2}R_{CLAMP}}{1+g_{m2}R_{CLAMP}} \quad (2)$$

where $g_{m1}$ is the transconductance of integrator 104, and $g_{m2}$ is the product of the transconductance of amplifier 370 and the voltage gain of amplifier 364.

The clamping offset voltage is reduced by the feedback loop because the transconductance $g_{m1}$ is being partially cancelled out by the transconductance $g_{m2}$. So, the clamping voltage is reduced to a relatively low value without sacrificing the voltage regulation accuracy of the regulator. So, a relatively large gain $g_{m2}*R_{CLAMP}$ can be used to achieve a small but well-controlled effective clamping offset voltage.

Figure 4:
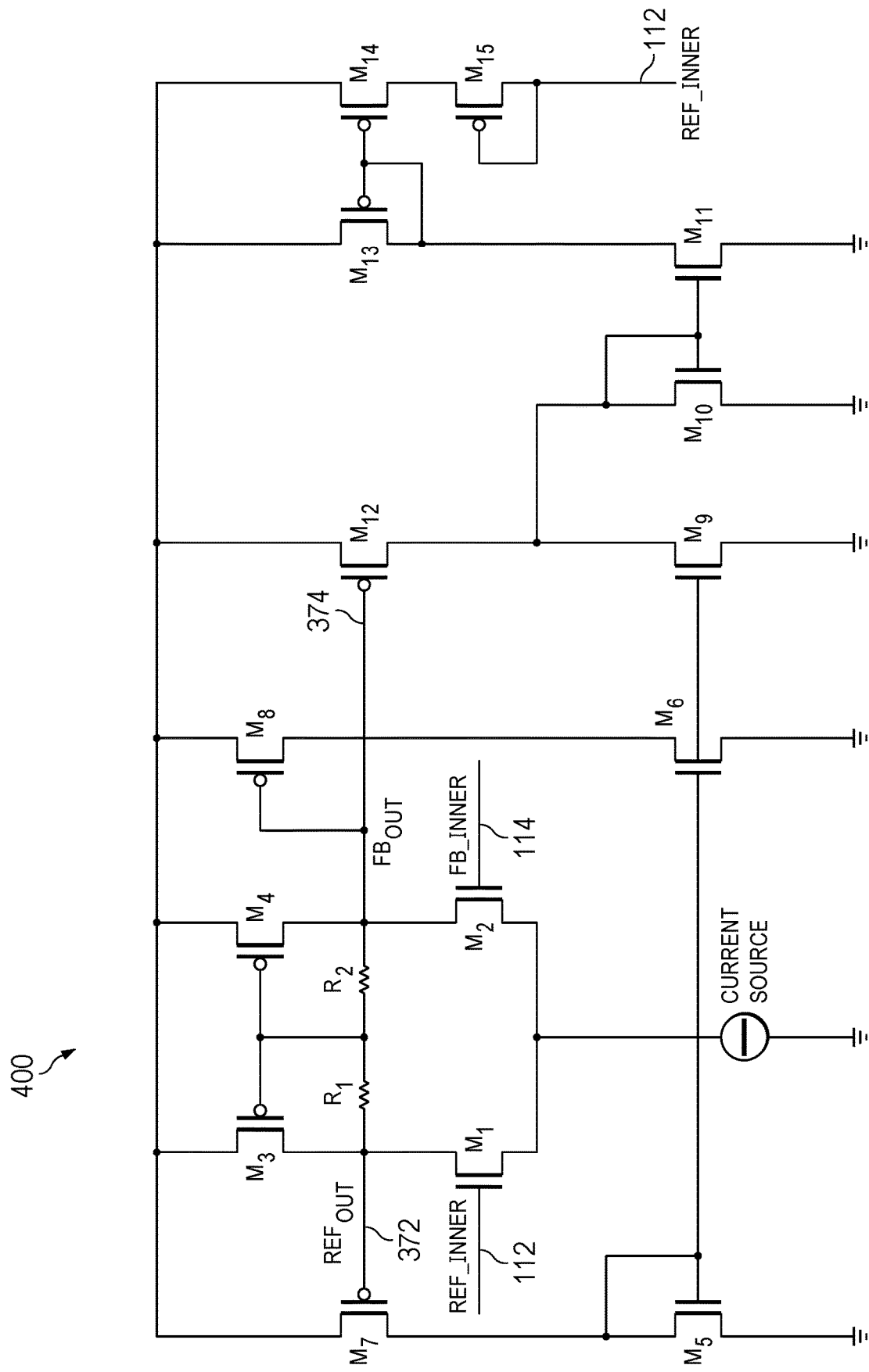
FIG. 4 shows a schematic diagram for an example circuit that includes a comparator preamplifier circuit, a comparator circuit, a transconductance circuit, and a current extractor.

FIG. 4 shows a schematic diagram 400 for an example circuit including a comparator preamplifier circuit 364, a comparator circuit 366, a transconductance circuit 370, and a current extractor 376. Comparator preamplifier circuit 364 includes transistors $M_1$, $M_2$, $M_3$, and $M_4$ and resistors $R_1$ and $R_2$. Comparator circuit 366 includes transistors $M_5$, $M_6$, $M_7$, and $M_8$. Transconductance circuit 370 includes transistors $M_5$, $M_7$, $M_9$, and $M_{12}$. Transistors $M_5$ and $M_7$ are shared between comparator circuit 366 and transconductance circuit 370. Current extractor 376 includes transistors $M_{10}$, $M_{11}$, $M_{13}$, $M_{14}$, and $M_{15}$.

The inputs to comparator preamplifier circuit 364 are REF_INNER 112 and FB_INNER 114. REF_INNER 112 is coupled to the gate of transistor $M_1$. FB_INNER 114 is coupled to the gate of transistor $M_2$. The differential outputs 372 and 374 of comparator preamplifier circuit 364 are provided as differential inputs to the transconductance circuit 370 at the gates of transistors $M_{12}$ and $M_7$. The gate of transistor $M_{12}$ is coupled to the gate of transistor $M_8$, the gates of transistors $M_3$ and $M_4$ through resistor $R_2$, and the gate of transistor $M_7$ through resistors $R_1$ and $R_2$. The drain of transistor $M_4$ is coupled to the drain of transistor $M_2$, and the drain of transistor $M_3$ is coupled to the drain of transistor $M_1$. Resistor $R_2$ is coupled between the gate and drain of transistor $M_4$. Resistor $R_1$ is coupled between the gate and drain of transistor $M_3$. The sources of transistors $M_1$ and $M_2$ are coupled to the output of a bias current source, which could be at ground or at some other voltage. The sources of transistors $M_7$, $M_3$, $M_4$, $M_8$, $M_{12}$, $M_{13}$ and $M_{14}$ are coupled together.

Transistors $M_{12}$ and $M_7$ are used to source the current from the comparator preamplifier circuit 364. Transistors $M_{10}$ and $M_{11}$ form a first current mirror, and transistors $M_{13}$ and $M_{14}$ form a second current mirror for sourcing a feedback current that is provided to REF_INNER 112 for cancelling a portion of the current through integrator 104.

Transconductance circuit 370 turns on and produces a feedback current only if the voltage at FB_Inner 114 is higher than the voltage at REF_INNER 112, or if the regulator is in the power save mode. To minimize the offset, a common gain stage is used to provide better matching, so that the circuit does not overcompensate or undercompensate with the current provided to REF_INNER 112.

In at least one case, the product of the comparator preamplifier circuit 364 and the transconductance of transconductance circuit 370 is designed to match the transconductance of integrator 104. Matching the transconductances of these two circuits helps to match the current provided by transconductance circuit 370 with the current provided by integrator 104. However, in other cases, the transconductance of transconductance circuit 370 may be different than the transconductance of integrator 104.

In this description, "terminal," "node," "interconnection," "lead" and "pin" are used interchangeably. Unless specifically stated to the contrary, these terms generally mean an interconnection between or a terminus of a device element, a circuit element, an integrated circuit, a device, or other electronics or semiconductor component.

In this description, "ground" includes a chassis ground, an Earth ground, a floating ground, a virtual ground, a digital ground, a common ground and/or any other form of ground connection applicable to, or suitable for, the teachings of this description.

In this description, the term "couple" may cover connections, communications or signal paths that enable a functional relationship consistent with this description. For example, if device A generates a signal to control device B to perform an action, then: (a) in a first example, device A is coupled to device B by direct connection; or (b) in a second example, device A is coupled to device B through intervening component C if intervening component C does not alter the functional relationship between device A and device B, so device B is controlled by device A via the control signal generated by device A.

In this description, even if operations are described in a particular order, some operations may be optional, and the operations are not necessarily required to be performed in that particular order to achieve specified results. In some examples, multitasking and parallel processing may be advantageous. Moreover, a separation of various system components in the embodiments described above does not necessarily require such separation in all embodiments.

Modifications are possible in the described embodiments, and other embodiments are possible, within the scope of the claims.

What is claimed is:

1. A circuit comprising:
a first amplifier having first and second amplifier inputs and a first amplifier output, wherein the first amplifier input is coupled to a reference voltage terminal, and the second amplifier input is coupled to a voltage feedback terminal;
a second amplifier having third and fourth amplifier inputs and second and third amplifier outputs, wherein the third amplifier input is coupled to the first amplifier output;
a first switch having first and second switch terminals, wherein the second switch terminal is coupled to the fourth amplifier input;
a resistor coupled between the first amplifier output and the first switch terminal;
a third amplifier having fifth and sixth amplifier inputs and a fourth amplifier output, wherein the fifth amplifier input is coupled to the second amplifier output, and the sixth amplifier input is coupled to the third amplifier output; and
a second switch having third and fourth switch terminals, wherein the third switch terminal is coupled to the fourth amplifier output, and the fourth switch terminal is coupled to the first amplifier output.

2. The circuit of claim 1, further comprising a common mode voltage generation circuit coupled to the fourth amplifier input.

3. The circuit of claim 1, further comprising a current extractor circuit coupled between the fourth amplifier output and the third switch terminal.

4. The circuit of claim 1, further comprising a fourth amplifier having seventh and eighth amplifier inputs and a fifth amplifier output, wherein the seventh amplifier input is coupled to the third amplifier output, and the eighth amplifier input is coupled to the fourth amplifier output.

5. The circuit of claim 4, further comprising:
a logic circuit having first and second logic inputs and a logic output, wherein the first logic input is coupled to the fourth amplifier output;
a driver circuit having a driver input and first and second driver outputs, wherein the driver input is coupled to the logic output;
a first transistor coupled between an input voltage terminal and a switching terminal;

a second transistor coupled between the switching terminal and a ground terminal; and
an inductor coupled between the switching terminal and an output voltage terminal.

6. The circuit of claim 5, wherein the resistor is a first resistor, and the circuit further comprises:
a first capacitor coupled between the first amplifier output and the ground terminal;
a second capacitor coupled between the output voltage terminal and an auxiliary terminal;
a third capacitor coupled between the auxiliary terminal and the fourth amplifier input; and
a second resistor coupled between the switching terminal and the auxiliary terminal.

7. The circuit of claim 6, further comprising:
a third resistor coupled between the output voltage terminal and the second amplifier input; and
a fourth resistor coupled between the second amplifier input and the ground terminal.

8. The circuit of claim 7, wherein the third amplifier output is zero unless a voltage at the fourth amplifier input is higher than a voltage at the third amplifier input.

9. The circuit of claim 5, further comprising a current detection circuit having a detection output, wherein the current detection circuit is configured to sense a current through the second transistor.

10. The circuit of claim 9, wherein the current detection circuit is configured to provide a zero-crossing signal at the detection output responsive to detecting a zero-crossing of the current through the second transistor.

11. A voltage regulator circuit, comprising:
an integrator having first and second integrator inputs and an integrator output, wherein the first integrator input is coupled to a reference voltage terminal, and the second integrator input is coupled to a feedback voltage terminal;
a comparator having first and second comparator inputs and first and second comparator outputs, wherein the first comparator input is coupled to the integrator output, and the second comparator input is coupled to an inner feedback terminal;
a transconductance amplifier having first and second transconductance inputs and a transconductance output, wherein the first transconductance input is coupled to the first comparator output, the second transconductance input is coupled to the second comparator output, and the transconductance output is coupled to the first comparator input;
a gate driver circuit having first and second gate drive outputs and a gate drive input, wherein the gate drive input is coupled to the comparator;
a high-side transistor having a high-side control terminal, wherein the high-side transistor is coupled between an input voltage terminal and a switch terminal, and the high-side control terminal is coupled to the first gate drive output; and
a low-side transistor having a low-side control terminal, wherein the low-side transistor is coupled between the switch terminal and a ground terminal, and the low-side control terminal is coupled to the second gate drive output.

12. The voltage regulator circuit of claim 11, wherein the transconductance amplifier includes:
a first field effect transistor (FET) having a first gate, a first drain and a first source, wherein the first gate is coupled to the first comparator output;
a second FET having a second gate, a second drain and a second source, wherein second source is coupled to the first source, and the second gate is coupled to the second comparator output;
a third FET having a third gate, a third drain and a third source, wherein the third drain is coupled to the first drain, the third gate is coupled to the third drain, and the third source is coupled to the ground terminal; and
a fourth FET having a fourth gate, a fourth drain and a fourth source, wherein the fourth gate is coupled to the fourth drain is coupled to the second drain, the fourth gate is coupled to the third gate, and the fourth source is coupled to the ground terminal.

13. The voltage regulator circuit of claim 11, further comprising:
a current extractor having an extractor input and an extractor output, wherein the extractor input is coupled to the transconductance output; and
a switch having first and second switch terminals, wherein the first switch terminal is coupled to the extractor output, and the second switch terminal is coupled to the first comparator input.

14. The voltage regulator circuit of claim 13, wherein the switch is a first switch, and the voltage regulator circuit further comprises:
a common mode voltage generator having a generator output;
a second switch having third and fourth switch terminals, wherein the third switch terminal is coupled to the generator output; and
a resistor coupled between the fourth switch terminal and the first comparator input.

15. The voltage regulator circuit of claim 13, wherein the extractor output is zero unless a voltage at the second comparator input is higher than a voltage at the first comparator input.

16. The voltage regulator circuit of claim 11, further comprising a comparator driver having first and second driver inputs and a driver output, wherein the first driver input is coupled to the first comparator output, and the second driver input is coupled to the second comparator output.

17. The voltage regulator circuit of claim 16, further comprising a logic circuit having first and second logic inputs and a logic output, wherein the first logic input is coupled to the driver output, and the logic output is coupled to the gate driver input.

18. The voltage regulator circuit of claim 17, further comprising a current detection circuit having a detection output, wherein the detection output is coupled to the second logic input, and the current detection circuit is configured to sense a current through the low-side transistor.

19. The voltage regulator circuit of claim 11, further comprising an inductor coupled between the switch terminal and an output voltage terminal.

20. The voltage regulator circuit of claim 19, further comprising:
a first resistor coupled between the output voltage terminal and the feedback voltage terminal;
a second resistor coupled between the feedback voltage terminal and the ground terminal; and
a capacitor coupled between the output voltage terminal and the ground terminal.

* * * * *